UNITED STATES PATENT OFFICE.

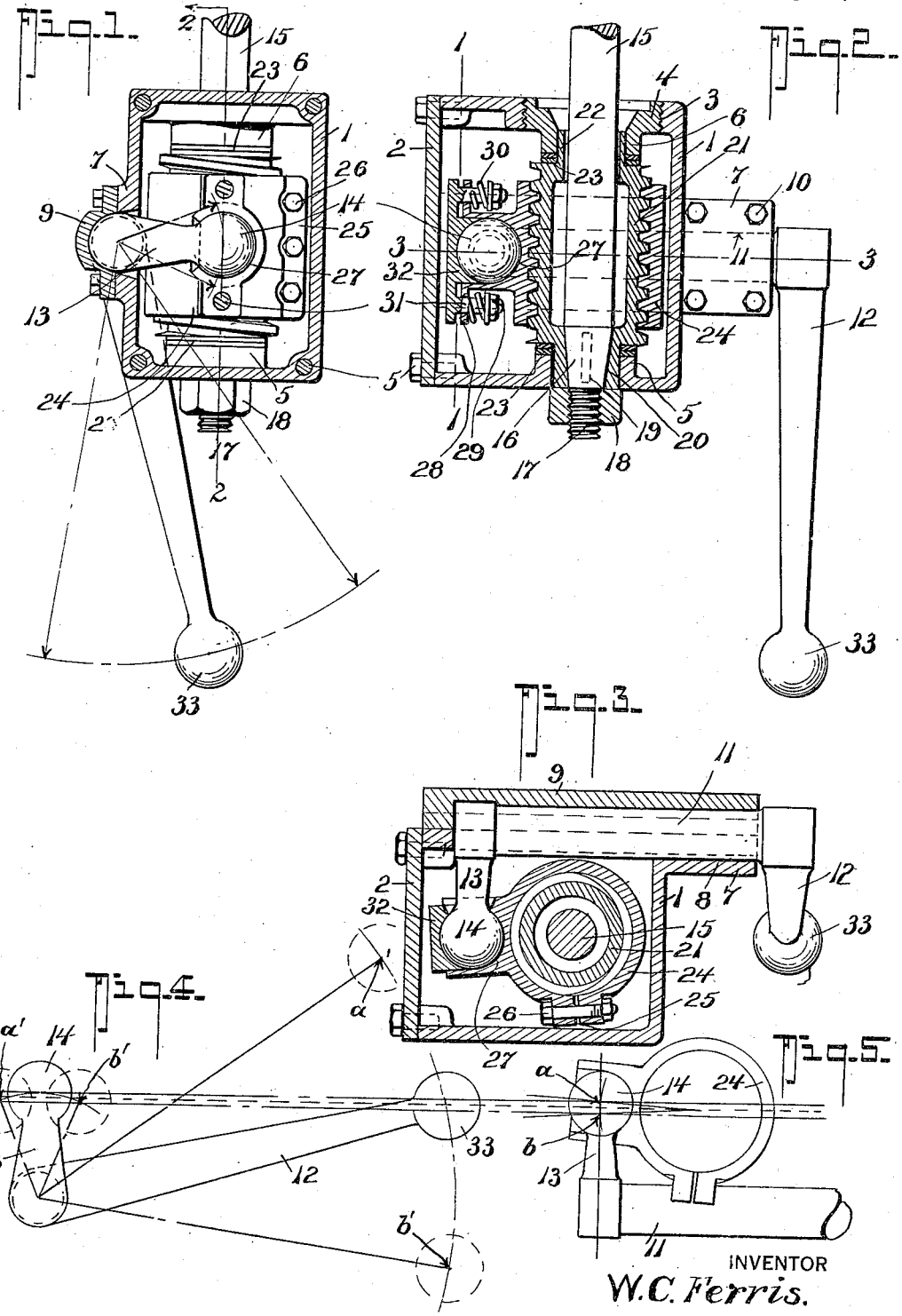

WALTON C. FERRIS, OF LINCOLN, NEBRASKA, ASSIGNOR TO NATIONAL MANUFACTURING CO., INCORPORATED, OF LINCOLN, NEBRASKA.

STEERING MECHANISM.

1,237,188.  Specification of Letters Patent.  Patented Aug. 14, 1917.

Application filed April 25, 1917. Serial No. 164,462.

*To all whom it may concern:*

Be it known that I, WALTON C. FERRIS, residing at Lincoln, in the county of Lancaster and State of Nebraska, have invented certain new and useful Improvements in Steering Mechanism, of which the following is a specification.

My invention relates to certain new and useful improvements in steering mechanism of the irreversible type and the invention primarily has for its object to provide a mechanism of this character of a simple and effective construction in which the parts are so arranged and designed that absolute accuracy in the machining and fitting of the parts is not necessary and in which provision is made for taking up wear on all of the moving parts so as to prevent loose play and rattling in the several parts of the mechanism.

Another object of the invention is to provide a mechanism whereby the power developed by the driving screw on the steering wheel shaft is taken from the driven nut by a ball arm directly, the ball arm being fitted on a fixed case and the stroke of the ball being compensated for by a slight revolving of the nut about the axis of the screw.

In carrying out my invention I provide a worm or screw mounted to turn in bearings in a suitable supporting case, the screw being secured to the steering post shaft whereby as the shaft is turned by the operator the screw will also be turned on its axis which is coincident with the shaft, the screw imparting axial movement to a nut that is threaded onto the screw and has a socket to receive the ball end of an arm that is pivoted to turn on a relatively stationary axis in a suitable bearing in the case, the arm projecting out of the case and carrying a lever to which the connecting rod of the steering gear is adapted to be attached in the usual manner, the arrangement being such that the nut may have a limited turning movement around the axis of the screw to compensate for the arcuate movement of the ball of the arm, means being provided in connection with the socket to compensate for the variation in the position of the geometric center with relation to the axis of the ball arm during the compensating turning movement of the nut around the axis of the screw.

In its more detail nature, the invention includes those novel details of construction, combination and arrangement of parts, all of which will be first fully described, then be specifically pointed out in the appended claims, and illustrated in the accompanying drawings, in which:

Figure 1 is a vertical section on the line 1—1 of Fig. 2.

Fig. 2 is a vertical section on the line 2—2 of Fig. 1.

Fig. 3 is a transverse section on the line 3—3 of Fig. 2.

Figs. 4 and 5 are diagrammatic views illustrating the movements of the ball arm and lever in connection with the socket carrying nut.

In the drawing, in which like letters and numerals of reference indicate like parts in all of the figures, 1 represents the casing which may be of any desired structure. It may be provided with a removable cap 2 for the purpose of introducing the nut into the casing, the casing being bored and tapped at 3 to receive a bearing nut 4 which has a bearing surface 6 for the bearing end 22 of the worm or screw 21. The casing 1 also has a bearing 5 for the other bearing end 20 of the nut 21, the bearing end 20 being conically recessed to receive the conical end 16 of the steering post wheel-shaft 15 by turning which the screw 21 is also turned. 18 is a nut threaded on the end 17 of the shaft 15 to hold the screw or worm 21 rigidly connected to the shaft, a Woodruff key 19 serving to key the screw or worm 21 to the shaft 16.

7 is a bearing section of the casing which has a cap 9, the cap 9 also being formed with a bearing surface to match the bearing surface 8 of the bearing 7 and form a long bearing for the shaft 11 which carries the arm 13 on which the ball 14 is located. The cap 9 is secured by bolts 10, or in any other suitable way, to the casing 1.

12 is the outside lever which has a ball 33 for connecting with the rod that connects the steering mechanism with the steering wheels of the vehicle in the usual manner (not shown).

23 represents thrust disks which take up the end thrust of the screw 21 and as these disks wear, the bearing plug 4 may be tightened down to take up the amount of wear within practical limits, after which, the disks 23 will have to be replaced with new ones.

24 designates the nut which is of the split type having ears 25 secured by bolts 26, so that as the contacting screw and nut surfaces wear, the wear may be taken up by tightening the bolt 26 as will be clearly understood by those skilled in the art.

The nut 24 has a socket extension 27 which is provided with ears 28 through which the pins 31 on the ears of the cap 32 project, the cap 32 having a half spherical portion to extend into the socket 27 and engage the ball 14, as best shown in Fig. 2 of the drawing, by reference to which it will be seen that springs 30 and nut 29 hold the cap 32 in position, the springs 30 allowing a slight outward yielding of the cap 32 to compensate for the slight shifting of the geometric center of the socket 27 from alinement with the axis of the ball 14 and arm 13. The nut 24 is turned slightly around the axis of the screw 21 during the change of position of the arm 13.

By reference to Figs. 1, 4 and 5, it will be noticed that the arm 13 moves between the limits $a'$—$b'$ (see Fig. 4) whereby the geometric center of the ball 14 is moved toward and from the axis of the shaft 11 reckoned in a direction parallel to the mid-position of the arm 13 (see full lines Fig. 4 for the mid-position and broken lines for the extreme positions). This requires a rocking of the nut 24 around the axis of rotation of the screw 21 to allow for the slight movement. This rocking action is indicated in Fig. 5 and is between the limits $a$ and $b$. It will be noticed, however, from Fig. 5, that the cord $a$—$b$ and the arc $a$—$b$ are, for practical purposes, practically identical. Therefore there will be but very slight movement of the geometric center of the socket 27 away from the geometric center of the ball 14, the geometric center of the ball 14 always lying on a plane containing the axis of the arm 13 and normal to the axis of the shaft 11. The slight shifting of the geometric center of the socket 27 away from the geometric center of the ball 14 will be compensated by the movement of the cap 32 toward or away from the socket 27 as the case may be, this movement being permitted by the use of the springs 30 which also act as anti-rattlers.

From the foregoing description, it will be observed that if the threads on the screw and in the nut are well made and a good end thrust for the screw is provided, moderate variations in the construction will have no appreciable effect on the working of the gear or its length of life. For instance, if the arm 13 is too long, the nut 24 will simply be in a little different position, or if the bearing 8 for the shaft 11 were cast a little off right angles from the shaft 14, the performance of the gear would not be hindered. There is no fixed distance to maintain between racks and pinions or side thrusts, thus the manufacturing problem is simplified and is due to the novel construction herein described.

From the foregoing description, taken in connection with the accompanying drawing, it is thought the complete construction, operation and advantages of the invention will be readily understood by those skilled in the art.

What I claim is:—

1. A steering mechanism comprising a supporting case having a shaft bearing, a shaft journaled in said bearing, a ball arm on said shaft within the case, a ball lever on said shaft outside of the case, a screw journaled in bearings in said case with its axis in a direction substantially transverse to that of the axis of said ball arm carrying shaft, a nut on said screw having a socket to receive the ball of the first mentioned ball arm, said nut having limited rocking motion around the axis of the screw and means for turning the screw.

2. A steering mechanism comprising a supporting case having a shaft bearing, a shaft journaled in said bearing, a ball arm on said shaft within the case, a ball lever on said shaft outside of the case, a screw journaled in bearings in said case with its axis in a direction substantially transverse to that of the axis of said ball arm carrying shaft, a nut on said screw having a socket to receive the ball of the first mentioned ball arm, said nut having limited rocking motion around the axis of the screw and means for turning the screw, said nut socket including a yieldable cap member engaging the ball.

3. In a steering gear, a supporting case having screw receiving bearings, a screw mounted in said bearings within the case, a nut on said screw, said nut having a half socket member, a cap mounted on said nut also having a half socket member to coöperate with the nut half socket member, means for yieldably connecting said cap to said nut, a ball-arm-carrying shaft journaled in a bearing in said housing, an arm on said shaft having a ball to fit in said socket members, said nut having rocking movement around the axis of said screw, a power transmission lever on said ball arm shaft outside of said case and a shaft projecting into and connected with said screw for turning the same.

4. In a steering gear, a supporting case having screw receiving bearings, a screw mounted in said bearings within the case, a nut on said screw, said nut having a half socket member, a cap mounted on said nut also having a socket member to coöperate with the nut half socket member, means for yieldably connecting said cap to said nut, a ball-arm-carrying shaft journaled in a bearing in said housing, an arm on said shaft having a ball to fit in said socket members, said nut having rocking movement around the axis of said screw, a power transmitting lever on said ball arm shaft outside of said axis, a shaft projecting into and connected with said screw for turning the same, one of said screw bearings of said case being movable along its axis for purposes of taking up any thrust wear.

5. A steering gear comprising a case having a screw receiving bearing at one end, a screw having a bearing projected into said case bearing, end thrust disks between said screw and said case bearing, a bearing plug threaded into said case and having a bearing surface to engage a second bearing surface on said screw, a nut on said screw, a ball arm shaft journaled in said case and having a ball carrying arm located within the case, said nut having a socket to receive the ball of said arm, said nut having compensating turning movement around the axis of said screw.

6. A steering gear comprising a case having a screw receiving bearing at one end, a screw having a bearing projected into said case bearing, end thrust disks between said screw and said case bearing, a bearing plug threaded into said case and having a bearing surface to engage a second bearing surface on said screw, a nut on said screw, a ball arm shaft journaled in said case and having a ball carrying arm located within the case, said nut having a socket to receive the ball of said arm, said nut having compensating turning movement around the axis of said screw, said nut being split, and means for connecting the split ends of said nut to take up wear.

7. A steering gear comprising a case having a screw receiving bearing at one end, a screw having a bearing projected into said case bearing, end thrust disks between said screw and said case bearing, a bearing plug threaded into said case and having a bearing surface to engage a second bearing surface on said screw, a nut on said screw, a ball arm shaft journaled in said case and having a ball carrying arm located within the case, said nut having a socket to receive the ball of said arm, said nut having compensating turning movement around the axis of said screw, said nut socket including an outwardly yieldable portion engaging the ball.

8. A steering gear comprising a case having a screw receiving bearing at one end, a screw having a bearing projected into said case bearing, end thrust disks between said screw and said case bearing, a bearing plug threaded into said case and having a bearing surface to engage a second bearing surface on said screw, a nut on said screw, a ball arm shaft journaled in said case and having a ball carrying arm located within the case, said nut having a socket to receive the ball of said arm, said nut having compensating turning movement around the axis of said screw, said nut being split, means for connecting the split ends of said nut for taking up wear, said nut socket including an outwardly yieldable portion engaging the ball.

9. A steering mechanism comprising a case having a transverse ball arm shaft bearing, a ball arm shaft mounted in said bearing, an arm on said shaft, a screw journaled in bearings in said case with its axis substantially at right angles to that of said shaft, a nut on said screw and a ball and socket connection between said nut and said arm and means for turning said screw.

10. A steering mechanism comprising a case having a transverse ball arm shaft bearing, a ball arm shaft mounted in said bearing, an arm on said shaft, a screw journaled in bearings in said case with its axis substantially at right angles to that of said shaft, a nut on said screw, a ball and socket connection including a yieldable section between said nut and said arm and means for turning said screw.

WALTON C. FERRIS.

Copies of this patent may be obtained for five cents each, by addressing the "Commissioner of Patents, Washington, D. C."